United States Patent [19]

Mutoh et al.

[11] Patent Number: 4,779,183
[45] Date of Patent: Oct. 18, 1988

[54] METHOD AND APPARATUS FOR SELECTIVELY CONTROLLING AN OPERATION MODE OF A PWM INVERTER BETWEEN AN ASYCHRONOUS MODE AND A SYNCHRONOUS MODE MODULATION

[75] Inventors: Nobuyoshi Mutoh, Katsuta; Akiteru Ueda, Ibaraki; Hideyuki Shimonabe, Chiba; Satoshi Ibori, Funabashi; Motonobu Hattori, Chiba; Kenji Nandoh, Matsudo; Yuuzi Yamasawa, Hitachiota, all of Japan

[73] Assignee: Hitachi, Ltd., Tokyo, Japan

[21] Appl. No.: 76,270

[22] Filed: Jul. 22, 1987

[30] Foreign Application Priority Data

Jul. 25, 1986 [JP] Japan .................. 61-173670

[51] Int. Cl.⁴ .............................................. H02M 1/08
[52] U.S. Cl. ...................................... 363/41; 318/811
[58] Field of Search .................... 363/41, 42; 318/808, 318/811

[56] References Cited

U.S. PATENT DOCUMENTS

| | | | |
|---|---|---|---|
| 4,318,167 | 3/1982 | Angquist | 363/41 |
| 4,409,535 | 10/1983 | Hickman | 318/811 |
| 4,419,615 | 12/1983 | Muto et al. | 318/811 |
| 4,615,000 | 9/1986 | Fujii et al. | 363/41 |

FOREIGN PATENT DOCUMENTS

| | | | |
|---|---|---|---|
| 105735 | 8/1979 | Japan | 363/42 |
| 174088 | 9/1985 | Japan . | |

*Primary Examiner*—William H. Beha, Jr.
*Attorney, Agent, or Firm*—Fay, Sharpe, Beall, Fagan, Minnich & McKee

[57] ABSTRACT

A method and apparatus are disclosed for controlling a pulse width modulated (PWM) inverter controlled for ignition by a (PWM) pulse produced with a carrier wave and a modulation wave. The method comprises sampling an amplitude of the modulation wave at a cycle rate related to the frequency of the carrier wave. The modulation wave and the carrier wave are synchronized when the sample modulation wave amplitude has a peak value greater than an amplitude of the carrier wave. The modulation wave and the carrier wave are asynchronized when the sampled modulation wave has a peak value less than the amplitude of the carrier wave.

6 Claims, 4 Drawing Sheets

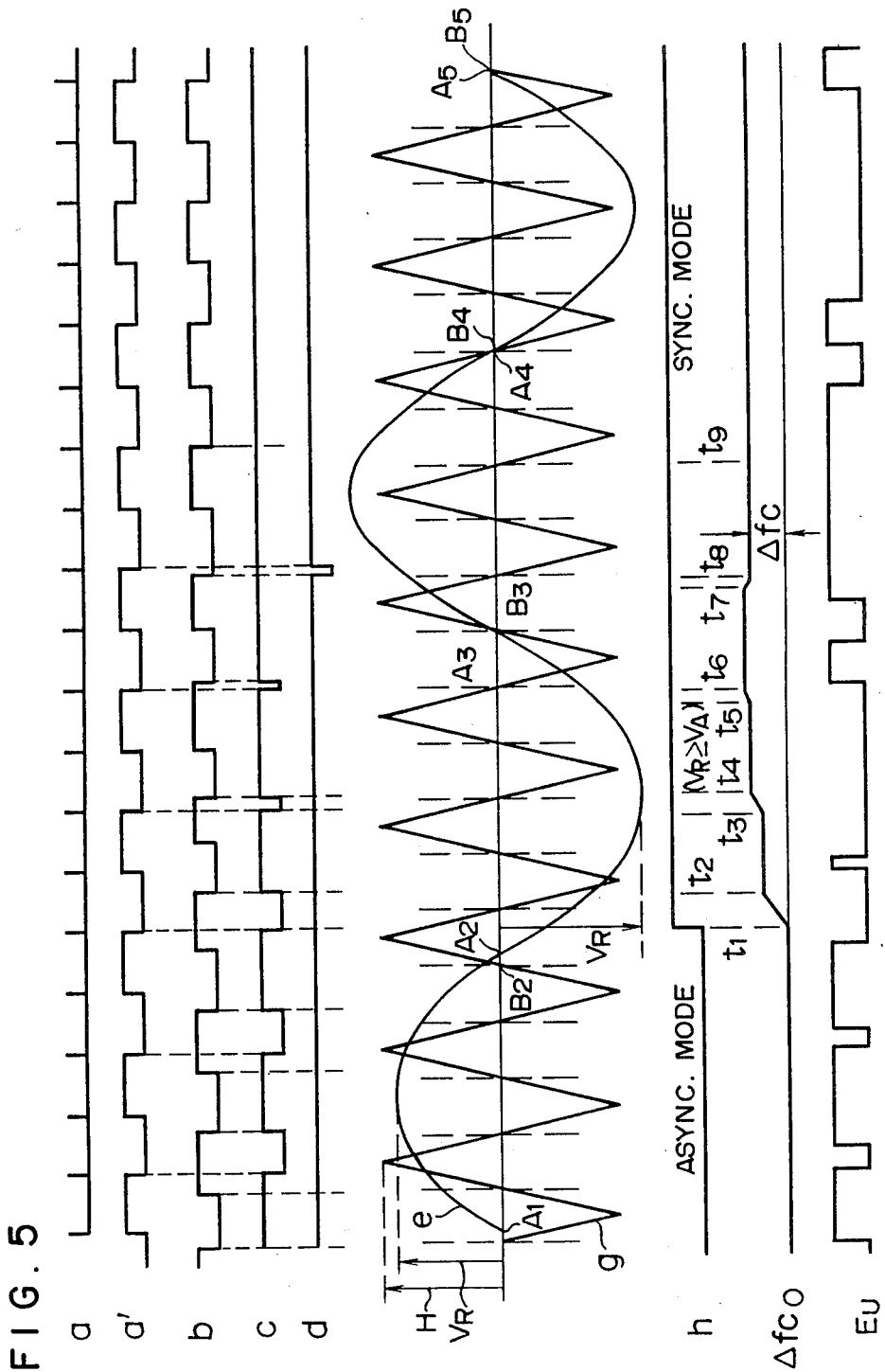

METHOD AND APPARATUS FOR SELECTIVELY CONTROLLING AN OPERATION MODE OF A PWM INVERTER BETWEEN AN ASYNCHRONOUS MODE AND A SYNCHRONOUS MODE MODULATION

BACKGROUND OF THE INVENTION

The present invention relates to a method and apparatus for controlling a PWM inverter used in a variable speed drive of an induction motor.

To operate at high efficiency over a wide range of speed, an adjustable-speed ac motor is provided with an adjustable-voltage and adjustable frequency power source. The voltage and frequency are not totally independent and are generally varied in such a way as to maintain a constant ratio of voltage to frequency. That is, higher ac voltage and higher frequency result in higher motor speed. It is typical to provide power to the motor with an adjustable-voltage, adjustable-frequency inverter. However, since the inverter operates from a relatively fixed source of dc voltage, control of the inverter output voltage must be provided in or associated with the inverter. The preferred technique is to pulse-width modulate the output voltage.

Various forms of pulse-width-modulation (PWM) have been proposed, with a form of sine-wave shaping being a preferred approach. Rapid advancements in microprocessor-based control systems and stored-program memory devices have reduced their costs and complexity to the point where they are used to generate the pulse-width-modulation switching times.

To produce a pulse width modulated (PWM) pulse used to control a PWM inverter, two systems are generally used, one is an asynchronous and the other is a synchronous system in which the modulation wave is in sychronism with the carrier. In the asynchronous system, the PWm pulse is produced while the carrier is not synchronized with a particular phase of an output voltage of the inverter. On the other hand, in the synchronous system, the PWM pulse is produced while the carrier is always synchronized with a particular phase of the output voltage of the inverter independently from an output frequency of the inverter. In order to produce the PWM pulse in this manner, a sine wave of the modulation wave is compared with a ramp wave of the carrier. In the pulse width control, harmonics are included in the output current of the inverter. In order to supress the harmonics, a frequency of $f_c$ of the carrier is selected higher than a frequency $f$ of the modulation wave (which is equal to a frequency of the inverter output voltage). In other words, a frequency ration $f_c/f$ is selected to be large. However, when the frequency $f_c/f$ is constant, a loss of a switching element of the inverter increases in a high frequency band. Accordingly, the frequency ratio $f_c/f$ is selected to be large in a low frequency band and gradually decreased as the inverter output frequency increases. This is disclosed in Japanese patent application, JP-A-60-174088.

The problems that have been encountered with these prior systems are that in the synchronous system, each time the frequency ratio $f_c/f$ changes, an overcurrent is generated and a torque is varied. Further, since harmonics of the output current change, magnetic noise of the motor changes and it presents an uncomfortable feeling.

On the other hand, in the asynchronous system, the carrier frequency $f_c$ may be set constant because the modulation wave and the carrier are asynchronous. As a result, the frequency ratio $f_c/f$ continuously changes as the inverter output frequency $f$ changes, and no trouble such as torque variation occurs. However, as an amplitude ratio $K_H$ of the modulation wave and the carrier is gradually increased to increase the inverter output voltage, the output current oscillates. The oscillation phenomenon has been confirmed by an experiment by the inventors.

It is an object of the present to provide method and apparatus for controlling a PWM inverter which do not cause a torque variation and a change of noise tone of the motor when the pulse is switched, and can stably drive the motor irrespective of the magnitude of the output voltage.

BRIEF SUMMARY OF THE INVENTION

In accordance with the present invention, whether the amplitude ratio of the modulation wave and the carrier wave is higher than a predetermined value or not is checked, and if it is lower than the predetermined value, the PWM pulse is produced in the asynchronous system, and if it is higher than the predetermined value, the PWM pulse is produced in the synchronous system.

The variation in time of the pulse width of the PWM pulse produced in the asynchronous system depends on the amplitude ratio. For the PWM pulse in one-half cycle of the output voltage of the inverter, as the number of PWM pulses whose duty factor is 1 increases (which corresponds to a state in which the amplitude ratio $K_H$ is larger than 1), the variation of the output voltage gradually increases and the oscillation of the output current also increases. Before such a phenomenon takes place, the control is switched such that the PWM pulse is produced in the synchronous system. Since the frequency of the PWM pulse lowers as the amplitude ratio increases, a switching loss of a switching element decreases. When the inverter frequency f is varied to effect constant V/f control, the voltage or amplitude ratio is also varied. At a frequency f which results in the amplitude ratio, $K_H$ being greater than one, the switching frequency of the switching element changes very slowly to the change of the inverter frequency f when the frequency ratio $f_c/f$ is kept constant and the PWM inverter is controlled in the synchronous system. In the asynchronous system, since the carrier frequency $f_c$ is kept constant, the frequency ratio $f_c/f$ continuously changes as the inverter frequency f changes. At the inverter frequency f which results in the amplitude ratio $K_H$ being greater than one, the synchronous system is selected and the frequency ratio $f_c/f$ is kept constant. Thus, the ratio $f_c/f$ continuously changes as the inverter frequency f changes, and the torque variation at the switching of pulse is prevented.

DETAILED DESCRIPTION OF THE PREFERRED EMBODIMENT

Figure 1:
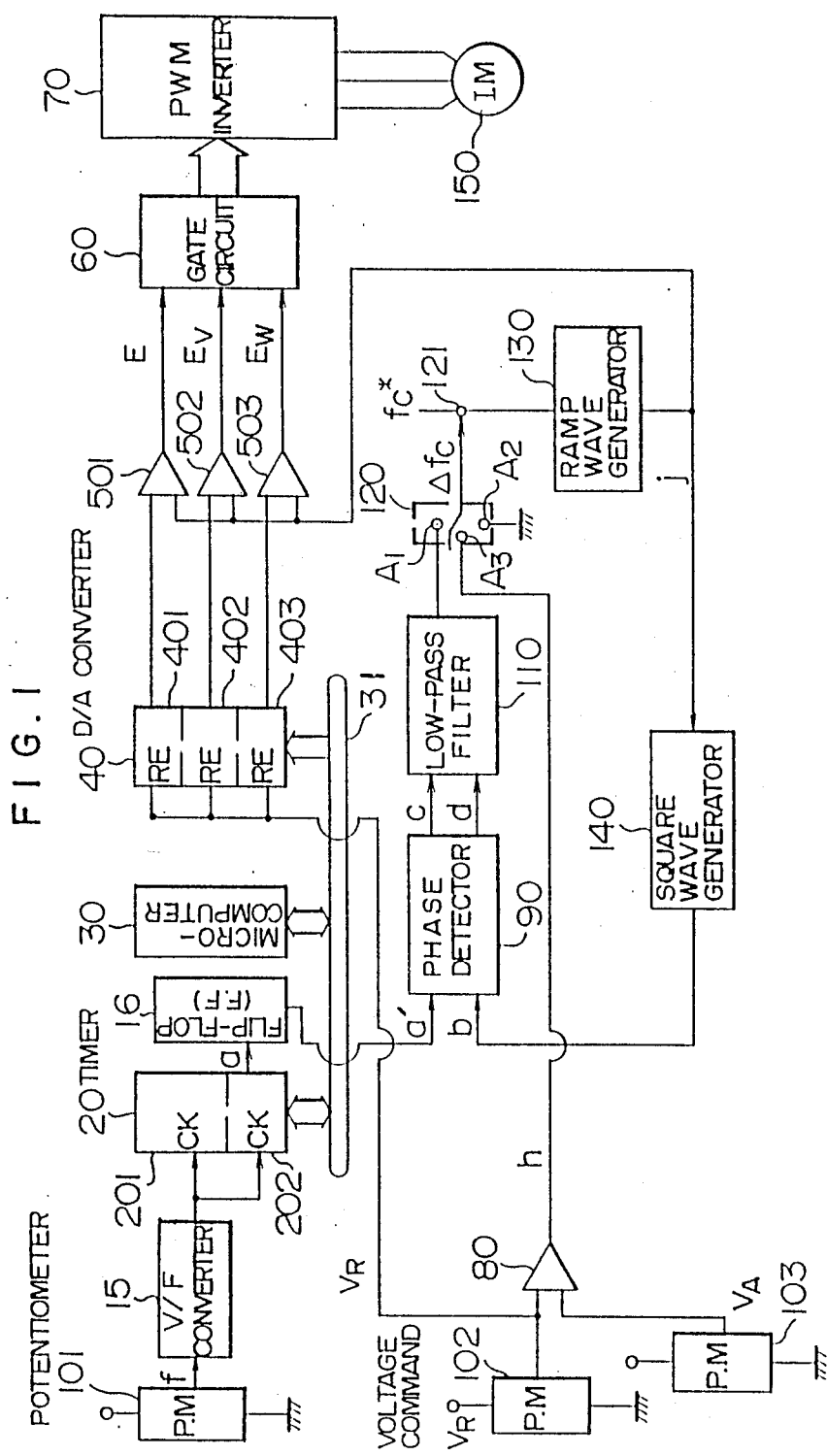
FIG. 1 shows a block diagram of one embodiment of the present invention.

FIG. 1 shows an embodiment of the present invention.

In FIG. 1, a potentiometer 101 sets the inverter frequency f. A frequency command f is supplied to a V/F converter 15, which produces a square wave at a frequency proportional to the frequency command f. The square wave generated by the V/F converter 15 is supplied to clock terminals CK of timers 201 and 202 of timer unit 20. An output signal a of the timer 202 is supplied to an R/S flip-flop circuit 16.

The timer unit 20, a microcomputer 30 and D/A converters 401, 402, and 403 of a D/A converter unit 40 are interconnected through data bus 31. Outputs (modulation waves) e of the D/A converters 401, 402, and 403 are supplied to corresponding comparators 501, 502, and 503, respectively. A voltage command $V_R$ set by a potentiometer 102 is applied to reference terminals RE of the D/A converters 401, 402, and 403. A ramp voltage (carrier) from ramp voltage generator 130 is applied to second input terminals of the comparators 501, 502, and 503.

Outputs (PWM pulses) of the comparators 501, 502, and 503 are supplied to a gate circuit 60. A gate signal (PWM pulse) from the gate circuit 60 is applied to a switching element of a PWM inverter 70. Since a construction of the PWM inverter 70 is well known, explanation thereof is omitted. Output terminals of the PWM inverter 70 are connected to an induction motor 150 so that an A.C. voltage of variable voltage and variable frequency is applied to the induction motor 150. The voltage command $V_R$ derived from the potentiometer 102 is also applied to the other input terminal of the comparator 80. An output terminal of the comparator 80 is connected to a control terminal $A_3$ of the analog switch 120. An input terminal $A_2$ of the analog switch 120 is grounded and an input terminal $A_1$ is connected to an output terminal of a low-pass filter 110.

Outputs c and d of a phase detector 90 are supplied to input terminals of the low-pass filter 110. An output sinal a' of the R/S flip-flop circuit 16 and on output signal b of a square wave generator 140 are supplied to the phase detector 90. The square wave generator 140 receives a ramp wave signal g of the ramp wave generator 130 and produces the square wave signal b which is synchronous with the ramp wave signal g. An adder 121 is connected to an input terminal of the ramp wave generator 130. A constant $f_c^*$ and a frequency correction signal $\Delta f_c$ supplied from the analog switch 120 are applied to the adder 121. The phase detector 90, low-pass filter 110, analog switching circuit 120, adder 121, ramp wave generator 130, and square wave generator 140 form a phase locked loop (PLL) circuit.

Figure 2:
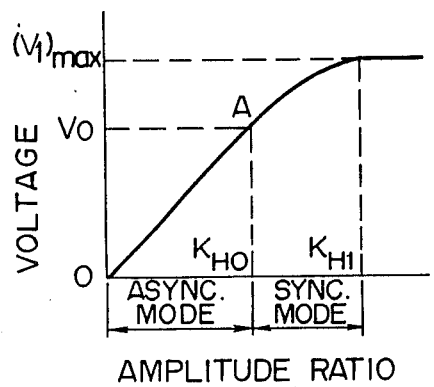
FIG. 2 shows a relationship between an inverter output voltage and an amplitude ratio.

The operation of FIG. 1 is now explained. When the induction motor is driven at a variable speed, it is common to vary a motor voltage (V) and a frequency (f) thereof at constant. In the constant V/f control, the inverter output voltage (V) is adjusted by changing the amplitude ratio of the modulation wave over the carrier ($K_H$). When the inverter frequency f is fixed, the amplitude ratio $K_H$ and the inverter output voltage V have a relationship shown in FIG. 2. When the amplitude ratio $K_H$ is smaller than a predetermined value $K_{HO}$, the inverter output voltage V is essentially proportional to amplitude ratio $K_H$. The predetermined value $K_{HO}$ is theoretically set to 1. However, a dead time $T_d$ is provided to prevent overlapping of the PWM pulse applied to the positive switching element PWM inverter and the PWM pulse applied to the negative switching element. Accordingly, the predetermined value $K_{HO}$ is actually smaller than 1 by an amplitude ratio for the dead time $T_d$.

Figure 3A:
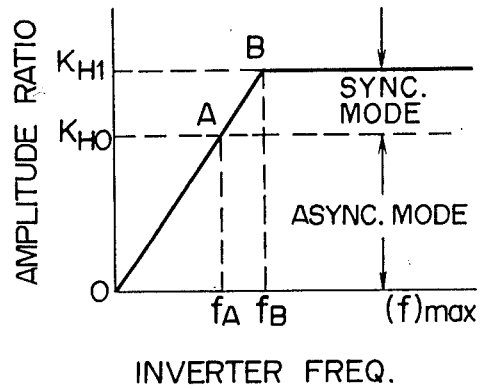
FIGS. 3a to 3c show a relationship between an inverter frequency, and a carrier frequency and a PWM signal frequency when the present invention is applied to constant V/f control.
Figure 3B:
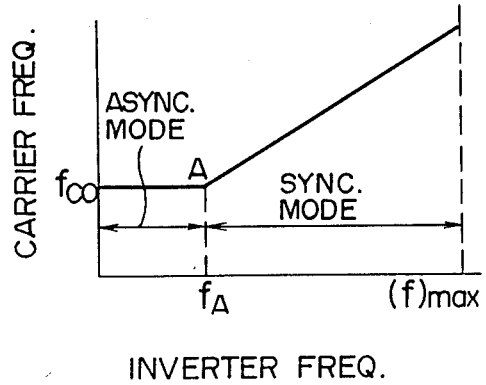
Figure 3C:
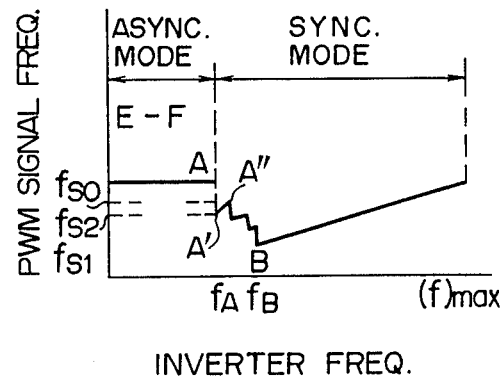

In the present invention, the asynchronous system (asynchronous mode) is adapted in a region in which the amplitude ratio $K_H$ is smaller than the predetermined value $K_{HO}$, and the synchronous system (synchronous mode) is adapted in a region in which the amplitude ratio $K_H$ is larger than the predetermined value $K_{HO}$. As a result, even if the frequency ratio $f_c/f$ is kept constant in the synchronous mode, the frequency $f_s$ of the PWM pulse is not so raised that a switching loss at a high frequency becomes prominent. This is explained below. FIGS. 3(a), 3(b), and 3(c) show relationships between the inverter frequency f, and the amplitude ratio $K_H$, the carrier frequency $f_c$, and the PWM pulse frequency $f_s$, respectively.

Figure 4A:
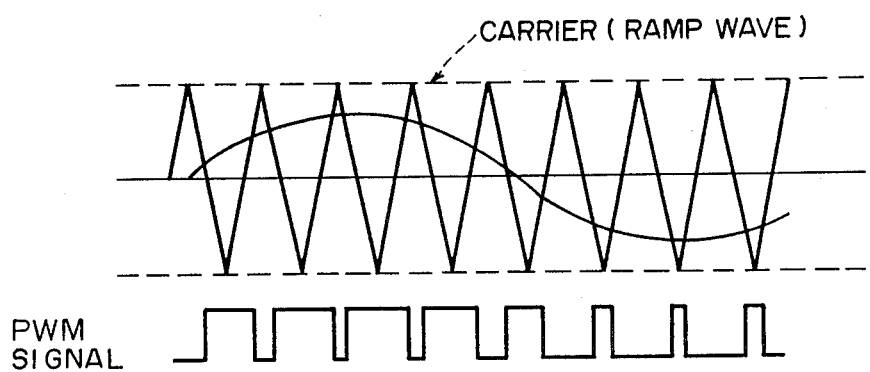
FIGS. 4a to 4c show a relationship between an modulation wave and a carrier; and, FIG. 5 shows a timing chart for explaining the operation of FIG. 1.

The PWM inverter 70 is operated in the asynchronous mode until the inverter frequency f reaches a predetermined frequency $f_A$. The carrier frequency $f_c$ is kept at a constant $f_{c0}$. As a result, as the inverter frequency f changes, $f_{c0}/f$ continuously changes. The sine wave, ramp wave (carrier), and the PWM signal have a relationship shown in FIG. 4(a).

Figure 4B:
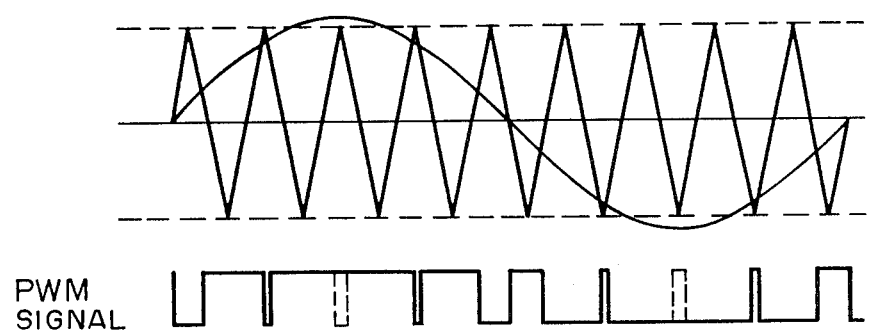
Figure 4C:
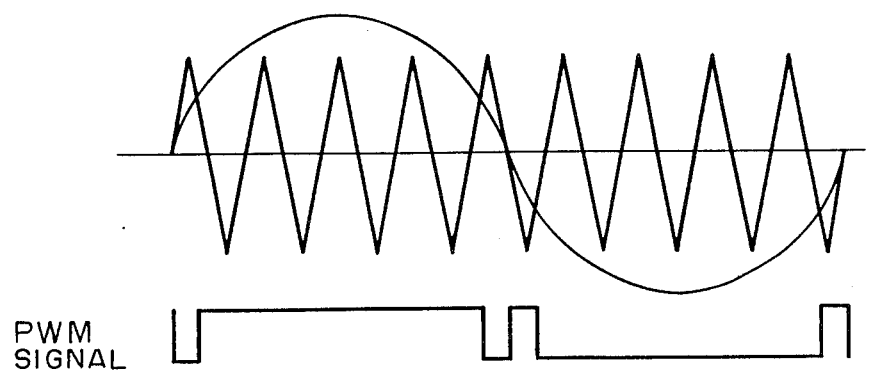

When the inverter frequency f is higher than the predetermined frequency $f_A$, the amplitude ratio $K_H$ increases accordingly. The PWM signal is shown in FIG. 4(b). Under this condition, the frequency $f_s$ of the PWM signal is lowered to $f_{s1}$ (FIG. 3(c)) which is lower than the frequency of the PWM signal shown in FIG. 4(a) than that corresponding to missed pulses shown by broken lines. If the inverter frequency f further rises, the PWM pulse frequency $f_s$ also increases accordingly. Since the amplitude ratio $K_H$ also increases, as the inverter frequency f rises to a point A" (FIG. 3(c)) the frequency $f_s$ of the PWM signal again falls. In FIG. 3, the frequency ratio $f_c/f$ is set to 9. Practically, a little bit larger ratio is selected. The frequency $f_s$ is reduced to the point B, as shown in FIG. 3, while repeating up and down, as the inverter frequency f is increased as shown in FIG. 4(c). At the inverter frequency f above a point B, the relationship between the sine wave and the ramp wave (carrier) is that shown in FIG. 4(c) and there is no longer pulse which is removed from the PWM signal. As a result, the frequency $f_s$ of the PWM signal rises as shown in FIG. 3(c).

The carrier frequency $f_c$ and the PWM signal frequency $f_s$ are then compared. In the constant $f_c/f$ control in the synchronous mode, the carrier frequency $f_c$ rises as the inverter frequency f rises.

However, since the frequency $f_s$ changes to the state shown in FIG. 4(c) by repeating up and down, it does not rise to a frequency at which switching loss is prominent.

This is explained more specifically. Let us assume that $f_A = 37.5$ Hz, $f_B = 50$ Hz, $(f)_{max} = 200$ Hz, and $f_c$ in the asynchronous mode is 1012.4 Hz. Then, the frequency ratio $f_c/f$ at the inverter frequency $f_A$ is 27. Under this condition, the inverter frequency f is increased, and the frequency $f_c$ when the amplitude ratio $K_H$ is 2.5 and the frequency f is $(f)_{max}$ is compared with $f_s$. The frequency $f_c = 5.4$ KHz. On the other hand, the number of pulses at the amplitude ratio $K_H = 2.5$ is 7 and hence the frequency $f_s$ is 1.4 KHz ($= 200 \times 7$). It is thus seen that the PWM signal frequency $f_s$ is not large compared to the carrier frequency $f_c$. The change of the PWM signal frequency $f_s$ in a region between the inverter frequencies $f_A$ and $f_B$ in FIG. 3(c) is due to missing of pulses from the PWM signal. The number of pulses is 1 to 2 which is very small. Under this condition, since the amplitude ratio $K_H$ continuously changes, there is no variation in the voltage.

The operation of the embodiment of FIG. 1 when the PWM control described above is applied thereto is explained with reference to FIG. 5. FIG. 5 shows waveforms when the mode is changed from the asynchronous mode to the synchronous mode with a variable voltage command $V_R$.

The inverter frequency command f derived from the potentiometer 101 is supplied to the V/F converter 15, which generates a square wave having a frequency proportional to the inverter frequency command f. The square wave is supplied to the timers 201 and 202 which produce clock signals. The timer 201 counts the square wave and the count thereof represents a phase of the sine wave. When the count of the timer 201 reaches a count corresponding to one period of the sine wave, the timer 201 is initialized. The timer 201 again counts the square wave until the count reaches the count corresponding to one period. On the other hand, the timer 202 counts until the count reaches a count corresponding to the frequency ratio $f_c/f$, when the timer 202 produces the pulse a. The pulse a is applied to the clock terminal CK of the R/S flip-flop circuit 16, which produces the square wave a' having levels "1" and "0" at the timing of the pulse a. In FIG. 5, the frequency ratio $f_c/f$ is set to 5 to simplify the explanation. The square wave signal a' from the R/S flip-flop circuit 16 is applied to the phase detector 90. The square wave signal b is also applied to the phase comparator 90. The phase detector 90 detects a phase difference from a falling time of the square wave signal a' to a falling time of the square wave b to produce a phase difference detect signals c and d. The phase difference detect signal c assumes a "0" level when the phase of the square wave b is retarded with respect to the square wave a' and a phase difference between the falling times of the square wave signals a' and b is detected, and assumes a "1" level under other conditions. On the other hand, the phase difference detect signal d assumes the "0" level when the phase of the square wave signal b is advanced with respect to the square wave signal a' and phase difference between the falling times of the signals a' and b' is detected, and assumes the "1" level under other conditions. The square wave b is generated by the square wave generator 140. The square wave generator 140 compares the ramp wave g with a zero level. If the level of the ramp wave g is positive the square wave b is of "1" level, and if it is negative, the square view b is of "0" level. The frequency $f_t$ of the ramp wave g is obtained as a sum of the constant $f_c^*$ and the frequency correction signal $\Delta f_c$ supplied form the analog switch 110. The frequency correction signal $\Delta f_c$ is produced in the following manner.

When the voltage command $V_R$ is smaller than the reference $V_A$, the modulation mode discriminating signal h from the comparator 80 is of "0" level. As a result, the analog switch 120 is connected to the input terminal $A_2$. Since the input terminal $A_2$ is grounded, the frequency correction signal $\Delta f_c$ is zero. Accordingly, the constant $f_c^*$ is set as a frequency $f_t$ of the ramp wave g and the asynchronous mode is started.

When the voltage command $V_R$ is larger than the reference $V_A$, the comparator 80 produces the "1" level modulation mode discriminating signal h so that the analog switch 120 is connected to terminal $A_1$.

This timing is shown by $t_1$ in the timing chart of FIG. 5. Between the times $t_1$ and $t_2$, the phase difference detector signal c is of "0" level and the positive frequency correction signal $\Delta f_c$ is added to the constant $f_c^*$ by the low-pass filter 110 to advance the phase of the ramp wave g. Between the times $t_2$ and $t_3$, the frequency correction signal $\Delta f_c$ derived at the time $t_2$ is held as it is. At the time $t_3$, a phase difference between the reference square wave a and the square wave b which is in phase with the ramp wave is again detected. As shown in FIG. 5, the phase is still in retard at this moment and hence the frequency correction signal $\Delta f_c$ derived at the time $t_3$ is increased. Between the times $t_4$ and $t_5$, the frequency correction signal $\Delta f_c$ derived at the time $t_4$ is held. The phase lag is compensated at the times $t_5$ and $t_6$. Between the times $t_7$ and $t_8$, the phase difference detect signal d is of "0" level and the phase of the square wave b is in advance with respect to the square wave a'. Thus, the frequency correction signal $\Delta f_c$ is decreased. As a result of such phase correction, after the time $t_9$, none of the signals c and d assume the "0" level and the phase of the square wave b is locked to the phase of the reference square wave a'. Since the phase of the square wave a' is synchronous with the phase of the sine wave, the sine wave and the ramp wave g are not in synchronism.

The operation to generate the PWM pulse is now explained. The content of the timer 201 is read by the microcomputer 30. On the other hand, a memory (not shown) of the microcomputer contains an amplitude value of a sine wave corresponding to the content of the timer 201. When the microcomputer 30 reads the content of the timer 201, it reads the amplitude value of the corresponding sine wave from the memory and transfers the value to the D/A converter 40. As a result, the D/A converters 401, 402, and 403 generate U-phase, V-phase and W-phase sine wave signals (modulation waves) e. The D/A converters 401, 402, and 403 receive the voltage command $V_R$ at their reference terminals RE. Accordingly, the amplitudes of the modulation waves e are proportional to the voltage command $V_R$. The U-phase, V-phase, and W-phase modulation waves e are supplied to the comparators 501, 502, and 503, respectively, and compared with the ramp wave g. The comparators 501, 502, and 503 produce the PWM pulses $E_U$, $E_V$, and $E_W$. Of those signals, the U-phase PWM pulse $E_U$ is shown in FIG. 5 as a representative. The PWM pulses $E_U$, $E_V$, and $E_W$ are supplied to the gate circuit 60. The gate circuit 60 applies the gate signal to the positive and negative switching elements of the PWM inverter, which responds to the gate signal to drive the induction motor 150. In this manner, the PWM inverter is controlled. In accordance with the present invention, the frequency ratio $f_c/f$ is kept constant in the synchronous mode without increasing the switching loss and the variation of the voltage when the pulse is switched is prevented and the motor can be smoothly driven.

In accordance with the present invention, even if the inverter frequency is raised, the motor can be smoothly driven without increasing the switching elements. Even if the inverter output voltage is raised at the high frequency band, the current is not disturbed and a constant torque control is attained over a wide range of speed.

In the above embodiment, the modulation wave is a sine wave and the carrier is a ramp wave. Alternatively, the modulation wave may be a step wave, pedestal wave, or a wave generated by superimposing a third harmonic, and the carrier may be a sawtooth wave or a ramp wave.

We claim:

1. A method for selectively controlling an operation mode of a PWM inverter between an asynchronous and a synchronous modulation mode for outputting a pulse width modulated pulse comprising the following steps:
   producing a modulation wave and a carrier wave;
   comparing an amplitude of the modulation wave with an amplitude of the carrier wave to derive an amplitude ratio;
   producing the pulse width modulated pulse while the modulation wave and the carrier wave are asynchronous when the amplitude ratio is lower than a predetermined value; and
   producing the pulse width modulated pulse while the modulation wave and the carrier wave are synchronous when the amplitude ratio is larger than the predetermined value.

2. A method for controlling a PWM inverter according to claim 1 wherein a frequency ratio of the modulation wave and the carrier is constant when the pulse width modulated phase is produced while the modulation wave and the carrier are synchronous.

3. A method for controlling a PWM inverter according to claim 1 wherein said predetermined value for the amplitude ratio is approximately one.

4. A method for generating a width modulated pulse for an inverter useful in a variable speed drive for an induction motor comprising the steps of:
   producing a modulation wave signal;
   producing a carrier wave signal;
   detecting a ratio of an amplitude of the modulation wave relative to the carrier wave;
   comparing the ratio with a predetermined value;
   synchronizing the modulation wave signal and the carrier wave signal when the ratio bears a first predetermined relationship to the predetermined value; and,
   asynchronizing the carrier wave signal and the modulation wave signal when the ratio bears a second predetermined relationship to the predetermined value.

5. A control method for a PWM inverter which is controlled for ignition by a pulse width modulated pulse produced with a carrier wave having a first frequency and an amplitude and a modulation wave having a second frequency and amplitude comprising:
   sampling the amplitude of the modulation wave and the carrier wave;
   synchronizing the modulation wave and the carrier wave when the sampled modulation wave amplitude has a peak value greater than the amplitude of the carrier wave; and,
   asynchronizing the modulation wave and the carrier wave when the sampled modulation wave amplitude has a peak value less than the amplitude of the carrier wave.

6. A control apparatus for a PWM inverter comprising:
   a PWM inverter;
   means for receiving an output frequency command for said PWM inverter and producing a modulation period signal in accordance with a pulse width modulation period;
   voltage command means for issuing a voltage command for said inverter;
   modulation wave generation means for generating a sine wave modulation wave having an amplitude proportional to said voltage command, at a frequency determined by the inverter frequency command;
   carrier generation means for generating a ramp wave carrier at a frequency determined by a carrier frequency command;
   mode command means for comparing the voltage command with a reference to command synchronous or asynchronous mode;
   phase matching means for matching phases of the modulation period signal and the carrier;
   selection means for selecting said phase matching means by a mode command of said mode command means; and
   pulse generation means for comparing the modulation wave with the carrier to generate a pulse width modulated pulse for application to said PWM inverter.

* * * * *

UNITED STATES PATENT AND TRADEMARK OFFICE
CERTIFICATE OF CORRECTION

PATENT NO. : 4,779,183

DATED : October 18, 1988

INVENTOR(S) : Nobuyoshi Mutoh, et al.

It is certified that error appears in the above—identified patent and that said Letters Patent is hereby corrected as shown below:

Please correct the spelling error in the title. "ASYCHRONOUS" should be "ASYNCHRONOUS".

Signed and Sealed this

Seventh Day of March, 1989

Attest:

DONALD J. QUIGG

Attesting Officer

Commissioner of Patents and Trademarks